(12) United States Patent
Pietsch et al.

(10) Patent No.: US 6,522,155 B2
(45) Date of Patent: Feb. 18, 2003

(54) SENSOR CONFIGURATION

(75) Inventors: Arnulf Pietsch, Regensburg (DE); Gerhard Wild, Regensburg (DE); Gerd Winkler, Auburn Hills, MI (US)

(73) Assignee: Siemens Aktiengesellschaft, Munich (DE)

(*) Notice: Subject to any disclaimer, the term of this patent is extended or adjusted under 35 U.S.C. 154(b) by 16 days.

(21) Appl. No.: 09/795,096

(22) Filed: Feb. 28, 2001

(65) Prior Publication Data

US 2002/0021136 A1 Feb. 21, 2002

(30) Foreign Application Priority Data

Aug. 17, 2000 (DE) .................................. 200 14 200 U

(51) Int. Cl.$^7$ .............................................. G01R 27/08
(52) U.S. Cl. ............... 324/691; 73/862.044; 340/425.5; 340/667; 340/686.1
(58) Field of Search .................................. 324/649, 691; 340/561, 562, 425.5, 667, 686.1; 73/862.474, 862.044, 862.045, 862.046

(56) References Cited

U.S. PATENT DOCUMENTS

| | | | | |
|---|---|---|---|---|
| 5,732,375 A | * | 3/1998 | Cashler | .................. 701/45 |
| 6,218,632 B1 | * | 4/2001 | McCarthy et al. | .......... 177/144 |
| 6,297,641 B1 | * | 10/2001 | Mattes et al. | ................ 324/523 |

* cited by examiner

*Primary Examiner*—Christine Oda
*Assistant Examiner*—Etienne P LeRoux
(74) *Attorney, Agent, or Firm*—Laurence A. Greenberg; Werner H. Stemer; Ralph E. Locher

(57) ABSTRACT

A sensor configuration for measuring the local distribution of a measured variable has a plurality of sensor elements which are disposed in a distributed fashion and interconnected in an array. An electric response of the sensor elements is a function of the local value of the measured variable. At least one of the sensor elements has a series circuit composed of a series element which is independent of the value of the measured variable and a measuring element which is dependent on the value of the measured variable.

15 Claims, 3 Drawing Sheets

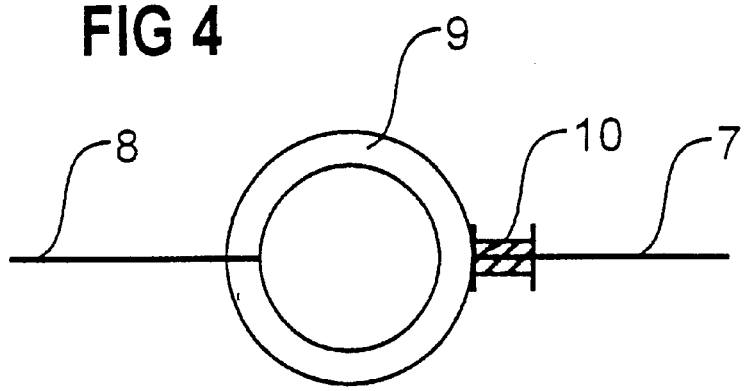
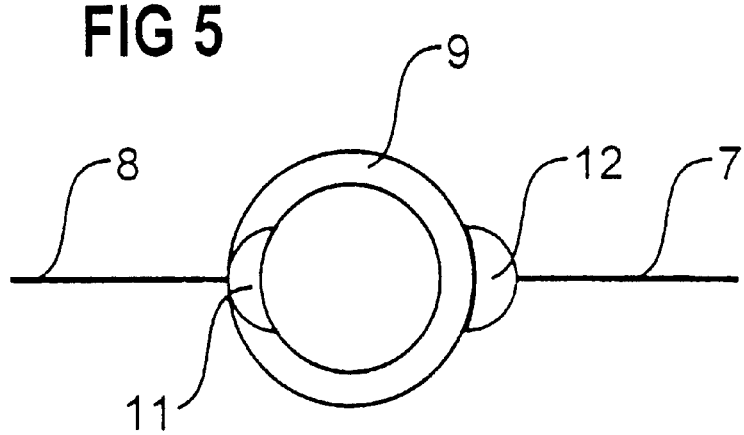
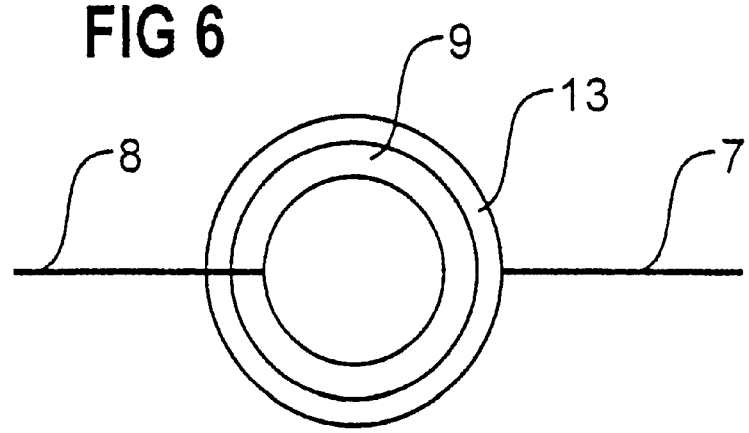

SENSOR CONFIGURATION

BACKGROUND OF THE INVENTION

Field of the Invention

The invention relates to a sensor configuration for measuring the local distribution of a measured variable, in particular as a sensor seat mat for detecting seat occupancy in a motor vehicle.

In order to detect seat occupancy in motor vehicles, use is made of so-called sensor seat mats having a multiplicity of pressure-sensitive sensors which are disposed in a distributed fashion in rows and columns on the seating surface and can thereby detect the pressure distribution on the seating surface. This permits a conclusion to be drawn as to the weight of the person located on the vehicle seat. The individual pressure-sensitive sensors have pressure-dependent electric resistors. This permits an electrical measuring element to measure the pressure acting on the seating surface of the motor vehicle seat at various points. As an example, for this purpose a constant current is fed into an individual row of the resistor configuration in matrix form, and the voltage drop across these rows and one of the columns is measured. Voltage drop across the associated resistor permits a calculation of the pressure acting at this point on the seating surface.

It is problematical in this case that the constant current fed in does not flow off only via a single pressure-dependent resistor, but also via parallel current paths which are formed by other pressure-dependent resistors of the sensor configuration. These parasitic currents falsify the measurement result. It is therefore necessary when measuring to ensure that the same voltage levels are present in each case at the other rows and columns, in order to avoid parasitic currents.

The calculation of the pressure acting on the seating surface from the measured resistance is performed with the aid of a prescribed characteristic line. It is preferable to use a low-resistance operating range of the characteristic line, since otherwise substantial errors could occur due to the influence of leakage currents. On the other hand, it must necessarily be avoided that a prescribed minimum resistance is undershot, since otherwise the above-described suppression of parasitic currents is rendered difficult. The disadvantage of this conflict between design targets is that the available operating range of the prescribed characteristic line cannot be utilized efficiently, since the pressure-dependent resistance is not permitted to drop below a prescribed limiting value. Therefore, only the high-resistance operating range with a correspondingly large measurement error can be used. Thus, the measurement error in the case of measurement in the range from 500 k$\Omega$ is up to 80%, for example.

SUMMARY OF THE INVENTION

It is accordingly an object of the invention to improve the above-described known sensor seat mat to the effect that it is possible to suppress parasitic secondary currents in conjunction with a measurement error which is as low as possible.

With the foregoing and other objects in view there is provided, in accordance with the invention, a sensor configuration for measuring the local distribution of a measured variable, comprising a plurality of sensor elements disposed in a distributed fashion and interconnected in an array. An electric response thereof is a function of the local value of the measured variable. At least one of the sensor elements has a series element independent of the value of the measured variable and a measuring element dependent on the value of the measured variable.

In one embodiment, the measuring element is a pressure-dependent resistor with a nominal resistance of between 100 k$\Omega$ and 500 k$\Omega$ and the series element is an ohmic resistor with an ohmic resistance of between 1 k$\Omega$ and 10 k$\Omega$. However, it is also possible to use as a measuring element a temperature-dependent resistor or a capacitor whose capacitance is a function of that measured variable.

In another embodiment, the sensor elements are disposed in a substantially planar fashion in rows and columns including two films disposed substantially parallel to one another made of electrically insulating material, on whose mutually facing lateral surfaces a plurality of conductor tracks are applied. A high-resistance layer which is disposed between the two films in each case has cutouts in the region of the points of intersection of the conductor tracks. The cutouts can be filled with a resisting material. Alternatively, resisting material can be disposed between the conductor tracks at the points of intersection of the conductor tracks without the need for cutouts.

In another embodiment, the above-noted sensor configuration includes a plurality of electrical terminals connected to the sensor elements for transmitting the electric response to a measuring instrument and/or to seat occupancy device in a motor vehicle.

The above-described sensor configuration can be used in combination with a seat occupancy device in a motor vehicle.

The invention is based on the general technical teaching of connecting the pressure-dependent resistor in series with a pressure-independent series resistor, in order to prevent the total resistance from falling below the prescribed minimum value. The operating range of the characteristic line can be more effectively utilized in this way, and therefore the sensor configuration can be operated in the more accurate low-resistance range. The measurement error can thus be minimized on the basis of the preferably logarithmic characteristic line.

However, the invention is not limited to the pressure acting on the seating surface as regards the measured variable to be detected. Rather, the principle according to the invention can also be used to detect other measured variables such as, for example, the temperature.

Neither is the invention limited to pressure-dependent resistors with respect to the sensor elements to be used, but it can also be implemented with other components whose electric response depends on the measured variable to be detected. Mention may be made, for example, of capacitive components in which the capacitance is a function of the dielectric properties of the sensor environment, i.e. whose capacitance is dependent on the measured variable.

In the preferred embodiment of the invention, the individual sensor elements contain a series circuit composed of a series element independent of the measured variable, and a measuring element dependent on the value of the measured variable. The measuring element is preferably a pressure-dependent resistor with a nominal resistance of preferably between 100 k$\Omega$ and 500 k$\Omega$. The series element is, by contrast, preferably an ohmic resistor whose nominal value is independent of the value of the measured variable to be detected and is preferably in the range of between 1 k$\Omega$ and 10 k$\Omega$.

The sensor elements are preferably disposed in a substantially planar fashion in rows and columns, the rows preferably being aligned at right angles to the columns. It is, however, also possible to arrange the individual sensor elements inside a space lattice, in order to determine the spatial distribution of the measured variable to be detected.

In the preferred embodiment, the sensor configuration according to the invention has two films, disposed substantially parallel to one another, of an electrically insulating material. A plurality of conductor tracks is applied to the mutually facing lateral surfaces of the films. The application of the conductor tracks can be performed in this case by printing or spraying, for example, but other methods of production are also possible. In this case, a high-resistance layer is disposed between the two films and in each case has cutouts in the region of the points of intersection of the conductor tracks. In this way, the films disposed adjacent one another can be pressed together in this region, and this leads to contacting of the conductor tracks. The cutout of the electrically insulating material is preferably also filled with a low-resistance resisting material, in order to increase the electrical resistance between the adjacent conductor tracks in the case of contact as well, and thereby to permit utilization of the entire operating range of the characteristic line.

Other features which are considered as characteristic for the invention are set forth in the appended claims.

Although the invention is illustrated and described herein as embodied in a sensor configuration, it is nevertheless not intended to be limited to the details shown, since various modifications and structural changes may be made therein without departing from the spirit of the invention and within the scope and range of equivalents of the claims. The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 4–6 show alternative embodiments of a sensor configuration according to the invention.

DESCRIPTION OF THE PREFERRED EMBODIMENTS

Figure 1:
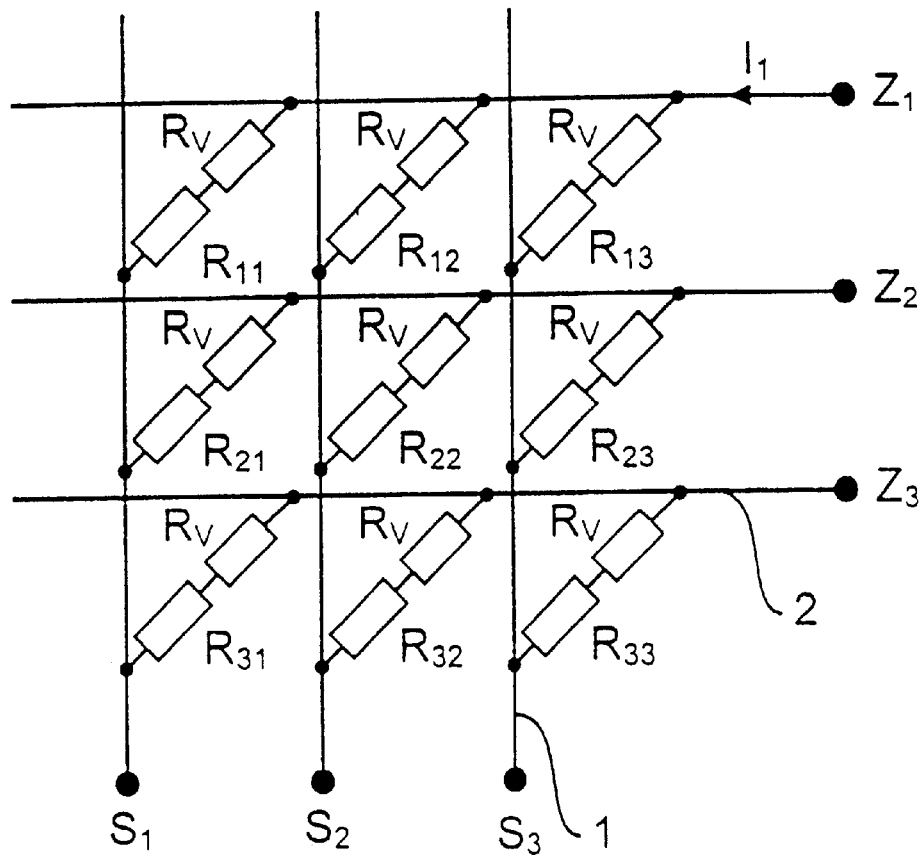
FIG. 1 shows a sensor configuration in matrix form, in a schematic illustration.

Referring now to the figures of the drawings in detail and first, particularly to FIG. 1 thereof, there is seen a sensor configuration which is a preferred exemplary embodiment of the invention, having a plurality of conductor tracks 1, 2 disposed in matrix form. The conductor tracks 1 and the conductor tracks 2 are disposed at right angles to one another in an essentially planar fashion in a common plane. For the sake of simplification, only three vertically extending conductor tracks 1 and three horizontally extending conductor tracks 2 are illustrated. However, the sensor configuration has a multiplicity of horizontal and vertical conductor tracks and thereby permits a relatively good local resolution in the determination of the mechanical pressure acting on the sensor configuration.

The terms horizontal and vertical refer in this case to the spatial alignment of FIG. 1 and not to the actual alignment of the sensor configuration. Thus, in the mounted state of the sensor seat mat, the horizontal conductor tracks 2 extend, for example, at right angles to the vehicle longitudinal axis, while the vertical conductor tracks 1 are disposed in this state parallel to the longitudinal axis of the vehicle.

The vertically extending conductor tracks 1 are connected in each case by a sensor element to the various horizontal conduct tracks 2. Each of the sensor elements has a pressure-dependent resistor $R_{ij}$ and a pressure-independent series resistor $R_v=5$ k$\Omega$. The series resistor $R_v$ has the task in this case of limiting the lower value of the total resistance of the individual sensor elements such that the sensor configuration can be operated in a low-resistance range without undershooting the minimum resistance which is required to suppress the parasitic currents.

A constant current $I_1$ at a terminal $Z_1$, for example, can be fed for the purpose of measuring the pressure acting on the seating surface in the region of the pressure-dependent resistor $R_{11}$, while the voltage drop between the terminal $Z_1$, and the terminal $S_1$, is measured. It must be ensured in this case that the electric potential at the terminals $Z_1$, $Z_2$, $Z_3$, $S_2$ and $S_3$ is identical, in order to avoid parasitic secondary currents which could falsify the measurement result.

Figure 3:
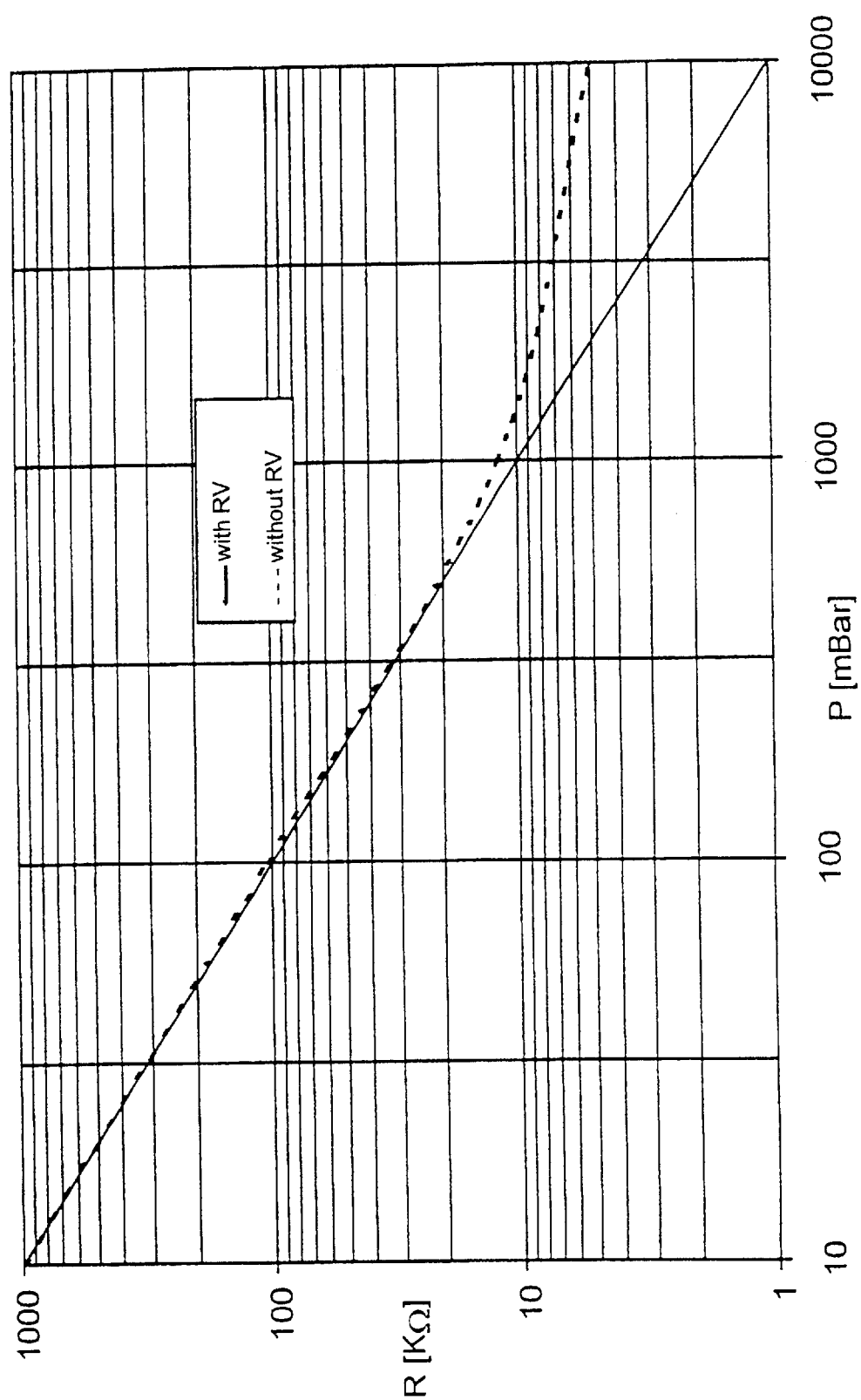
FIG. 3 shows a characteristic line of a sensor element according to the invention, compared to a conventional sensor element.

The total resistance of the sensor element, containing the pressure-dependent resistor $R_{11}$, and the pressure-independent $R_v$, can be determined from the constant current $I_1$ fed at the terminal $Z_1$ and the electrical potential dropping across the terminals $Z_1$ and $S_1$. The pressure acting on the seating surface can then be calculated with the aid of the prescribed characteristic line illustrated in FIG. 3, which reproduces the functional relationship between the pressure P acting on the seating surface and the total resistance R of the sensor element.

As an alternative to this, the measurement can also be performed with the aid of a constant-voltage source, while the variable current is measured.

Figure 2:
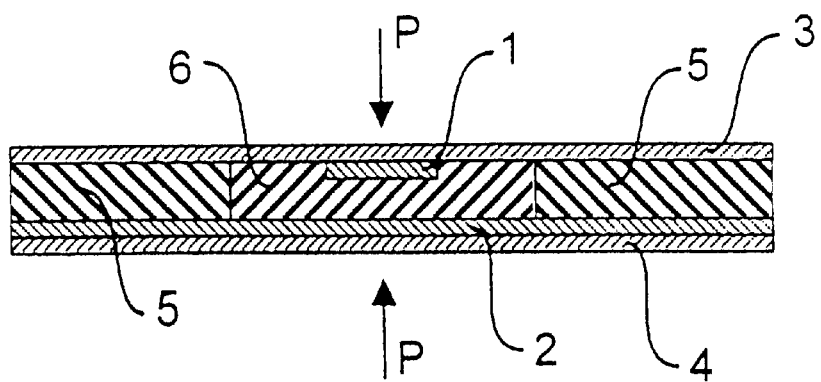
FIG. 2 is shows a cross section through the sensor configuration illustrated in FIG. 1, in the region of a point of intersection of the conductor tracks.

The structure of one of the sensor elements may be seen from FIG. 2. Thus, the sensor seat mat has two films 3, 4 which are disposed parallel to one another and are made from an electrically insulating material. Conductor tracks 1, 2 which are mutually perpendicular in each case are disposed on the mutually facing lateral surfaces of the films 3, 4. Otherwise, the interspace between the films 3, 4 is filled by an electrically insulating material 5. The electrically insulating material 5 has in the region of the point of intersection between the conductor tracks 1, 2 cutouts which are filled by a high-resistance material 6 in order to increase the total resistance of the individual sensor elements.

FIGS. 4 to 6 show alternative embodiments of a sensor element for use within the scope of the sensor configuration according to the invention. Each of the sensor elements illustrated in FIGS. 4 to 6 corresponds in this case to one of the series circuits, shown in FIG. 1, composed of a series resistor $R_v$ and a sensor element $R_{ij}$.

The sensor element illustrated in FIG. 4 has a supply lead 7 for the underside and a separate supply lead 8 for the top side of the sensor element. It is noticeable that the sensor elements illustrated in FIGS. 4 to 6 are constructed similarly in cross section to the sensor element shown in FIG. 2.

Furthermore, the sensor element has a force-dependent resistor 9 which is disposed between two film layers (not illustrated).

It is important in this case that the supply lead 7 does not make direct contact with the underside. However, disposed between the supply lead 7 and the underside of the sensor element is a resistor 10 which can be applied as a graphite structure to the respective substrate material of the silver lines using the screen printing method. The resistor 10 therefore corresponds to the series resistor $R_v$ illustrated in FIG. 1.

The exemplary embodiment illustrated in FIG. 5 corresponds largely to the exemplary embodiment illustrated in FIG. 4, and therefore the same reference numerals are used below. Reference is made in this regard to the previous description relating to FIG. 4, in order to avoid repetitions.

The special feature of the exemplary embodiment in accordance with FIG. 5 resides in two series resistors 11, 12 being connected in series to the connecting contacts of the supply leads 7, 8.

The exemplary embodiment illustrated in FIG. 6 also corresponds largely to the exemplary embodiment illustrated in FIG. 4, and therefore the same reference numerals are used below. Reference is made in this regard to the previous description relating to FIG. 4, in order to avoid repetitions.

The difference between this exemplary embodiment and the exemplary embodiments previously described resides essentially in that the sensor element is surrounded by an annular resistor 13. However, the resistor 13 need not enclose the entire sensor element. Rather, it is also possible for the resistor 13 to be in the shape of a circular segment.

The invention is not limited to the preferred exemplary embodiment described above. Rather, a multiplicity of modifications and variants are possible, which make use of the underlying inventive concept of the invention and, therefore, likewise fall within the extent of protection.

We claim:

1. A sensor arrangement for measuring the local distribution of a measured variable, comprising:

a plurality of sensor elements arranged in a distributed fashion and interconnected in an array, said sensor elements having an electric response being a function of a local value of a measured variable, at least one of said sensor elements having an element independent of the value of the measured variable and a measuring element dependent on the value of the measured variable connected directly in series without an intervening electrical connection between said element and said measuring element; and a plurality of electrical terminals connected to said sensor elements to detect the electric response of at least one of said sensor elements with a measuring instrument.

2. The sensor configuration according to claim 1, wherein said measuring element is a pressure-dependent resistor.

3. The sensor configuration according to claim 2, wherein said measuring element has a nominal resistance of between 100 k$\Omega$ and 500 k$\Omega$.

4. The sensor configuration according to claim 1, wherein said series element is an ohmic resistor.

5. The sensor configuration according to claim 4, wherein said series element has an ohmic resistance of between 1 k$\Omega$ and 10 k$\Omega$.

6. The sensor configuration according to claim 1, wherein said sensor elements are disposed in a substantially planar fashion in rows and columns.

7. The sensor configuration according to claim 1, including two films disposed substantially parallel to one another, made of electrically insulating material and having mutually facing lateral surfaces, a plurality of conductor tracks applied on said mutually facing lateral surfaces, and high-resistance layer disposed between said two films, said high-resistance layer each having cutouts in the region of the points of intersection of said conductor tracks.

8. The sensor configuration according to claim 7, wherein said cutouts are filled with a resisting material.

9. The sensor configuration according to claim 7, including a resisting material disposed between the conductor tracks at the points of intersection of the conductor tracks.

10. In combination with a seat occupancy device in a motor vehicle, the sensor configuration according to claim 1.

11. The sensor configuration according to claim 1, wherein said measuring element is a temperature-dependent resistor.

12. The sensor arrangement according to claim 1, wherein said measuring element is a capacitor whose capacitance is dependent on said measured variable.

13. The sensor configuration according to claim 1, including a plurality of electrical terminals connected to said sensor elements for transmitting said electric response to a measuring instrument.

14. The sensor configuration according to claim 1, including a plurality of electrical terminals connected to said sensor elements for transmitting said electric response to a seat occupancy device in a motor vehicle.

15. The sensor configuration according to claim 1, including a plurality of electrical terminals connected to said sensor elements for transmitting said electric response to a measuring instrument.

* * * * *